Patented Apr. 18, 1939

2,154,872

UNITED STATES PATENT OFFICE 2,154,872

ADHESIVE FOR LINOLEUM AND THE LIKE FLOOR COVERINGS

Curt Schülein, Bopfingen, Wurttemberg, Germany

No Drawing. Application November 24, 1937, Serial No. 176,389. In Germany August 27, 1935

6 Claims. (Cl. 134—23.7)

Linoleum and the like floor coverings, for example of rubber or other artificial materials, must be firmly attached to the base, which may consist of wood, stone or the like, in order to prevent moisture from penetrating into this base when cleaning the floor and the like. This firm adherence must however be permanent and unaffected by variations in expansion and contraction between the base and floor covering caused by high and low temperatures respectively.

In addition to ensuring firm adherence as aforesaid an adhesive for linoleum or the like must however also be as chemically neutral as possible. It must not have any detrimental action on the base consisting for example of cement, mortar, beton, stone, wood, gypsum or the like nor must it in the course of time be itself attacked and more or less destroyed by constituents dissolved out of the base.

The most varied substances have been proposed and used as adhesives for linoleum and the like floor coverings, but these were only in part capable of fulfilling the requirements demanded of them. Use has in particular been made of copal resin adhesives or cements prepared from copal and alcohol, but these adhesives possess only slight elasticity and are extremely brittle and in the course of time the firm adhesion more or less disappears. The most varied mixtures of asphalt and oily substances have also been proposed, but these also did not give complete satisfaction.

The new adhesive for linoleum and the like floor coverings according to this invention consists of a highly viscous liquid or plastic mass containing a mixture of soft resin, for example colophony, and hard resin (copal) in alcoholic solution in addition to alkali-resin soap and finely divided mineral substances.

The adhesive of this invention possesses very pronounced elasticity and high adhesive powers both on wood and on stone, is waterproof and resistant to alkalies, possesses the same coefficient of expansion as linoleum, solidifies on the exclusion of air and sets very rapidly.

It is important that all the aforesaid substances should be present. Soft resin alone, such as colophony, dammar resin, coumarone resin or the like, is much too brittle. The same applies to hard resins, for example manila copal or other copals, particularly those which are soluble in alcohol and are employed in the production of the adhesive of this invention. It is only by the use of alkali resin soap that this brittleness is removed. The addition of finely divided substances also has a favourable effect in this direction. The latter in addition control the coefficient of expansion of the final product and maintain the elasticity of the adhesive at low temperatures.

The adhesive of this invention may be further improved by incorporating therewith small quantities of a drying or semi-drying oil. Care must be taken as far as possible to select an oil, which is soluble in or miscible with alcohol, in order to ensure that the adhesive is homogeneous. The quantity of oil present in the adhesive must however be small so that it cannot act on the base.

The following example serves to illustrate how the adhesive according to this invention may be prepared:

40 kgms. of alcohol are introduced into a stirring apparatus and 67 kgms. of colophony and 20 kgms. of manila copal in a finely powdered form are added thereto. The mixture is thoroughly stirred until a clear solution is obtained. The solution is then heated to 25–30° C. and first 3 kgms. of castor oil and then 10 kgms. of soda lye (38° Bé.) are introduced with constant stirring. After saponification has taken place 140 kgms. of finely ground chalk are mixed in. A homogeneous plastic mass results, which need only be stirred into a paste with a little alcohol before use. This paste can then be immediately painted over the linoleum or the like.

A particular advantage of the new adhesive of this invention over and above the hereinbefore described effects is that the linoleum or other floor covering can be pressed onto the base immediately after the application of the adhesive and that prolonged application of pressure for the purpose of producing firm adherence is unnecessary. A further advantage is the extremely high efficiency—1 kgm. of the new adhesive is sufficient for from 2 to 3 square metres of linoleum.

What I claim is:

1. An adhesive for linoleum floor coverings and the like comprising a spreadable mass containing a mixture of soft resin and hard resin, both in alcoholic solution, and in addition an alkali resin soap, and finely divided mineral substances.

2. An adhesive for linoleum floor coverings and the like comprising a spreadable mass containing a mixture of soft resin and hard resin, both in alcoholic solution, and in addition an alkali resin soap, a small quantity of an oil soluble in alcohol, and finely divided mineral substances.

3. An adhesive for linoleum floor coverings and the like comprising a spreadable mass containing a mixture of soft resin and hard resin, both in alcoholic solution, and in addition a soap and finely divided mineral substances.

4. An adhesive for linoleum floor coverings and the like comprising a spreadable mass containing a mixture of resin and copal, both in alcoholic solution, and in addition an alkali resin soap and finely divided mineral substances.

5. An adhesive for linoleum floor coverings and the like comprising a saponification product of 67 kgms. of colophony, 20 kgms. of manila copal, 3 kgms. of castor oil and 10 kgms. of soda lye of 38° Bé. in 40 kgms. of alcohol, in admixture with 140 kgms. of finely ground chalk.

6. A method for preparing an adhesive for linoleum floor coverings and the like which consists in dissolving 67 kgms. of colophony and 20 kgms. of manila copal in 40 kgms. of alcohol, adding 10 kgms. of soda lye of 38° Bé. while heating to 25–30° C. and 3 kgms. of castor oil, and mixing thereafter 140 kgms. of finely ground chalk to the solution.

CURT SCHÜLEIN.